3,541,158
1-(DI(LOWER ALKOXY)-4-ALKYLPHENYL)-
2-NITROPROPENES
Alexander T. Shulgin, Lafayette, Calif., assignor to The Dow Chemical Company, Midland, Mich., a corporation of Delaware
No Drawing. Continuation-in-part of application Ser. No. 605,598, Dec. 29, 1966. This application Dec. 19, 1967, Ser. No. 691,717
Int. Cl. C07c 43/22
U.S. Cl. 260—613     8 Claims

ABSTRACT OF THE DISCLOSURE

1 - (di(lower alkoxy) - 4 - alkyphenyl) - 2 - nitropropenes wherein alkoxy occupies one pair of the 2,5 and 2,6 positions on the benzene ring and alkyl is from 1 to 6 carbon atoms, inclusive. These compounds are useful as intermediates and pesticides.

CROSS-REFERENCE TO RELATED APPLICATION

This application is a continuation-in-part of application Ser. No. 605,598, filed Dec. 29, 1966, now abandoned.

BACKGROUND OF THE INVENTION

The present invention is concerned with novel chemical compounds and methods for their preparation and is particularly directed to a class of 1-(di(lower alkoxy)-4-alkylphenyl)-2-nitropropenes. These compounds are useful as pesticides and also as intermediates for the preparation of novel 4-alkyl-2,5- and 2,6-dialkoxy-α-methylphenethylamines and their pharmacologically-acceptable salts. The latter compounds are of outstanding value as stimulants of the nervous system of vertebrates. These properties and latter compounds are disclosed in my copending applications Ser. No. 605,550, now abandoned, filed Dec. 29, 1966, for "4-Alkyl-2,5-Dimethoxy-α-Methylphenethylamines and Their Pharmacologically-Acceptable Salts," and Ser. No. 691,709, now abandoned, filed even date herewith for "4-Alkyl-Dialkoxy-α-Methylphenethylamines and Their Pharmacologically-Acceptable Salts."

SUMMARY OF THE INVENTION

The present invention is directed to a group of new 1 - (di(lower alkoxy) - 4 - alkylphenyl) - 2-nitropropene compounds corresponding to the formula:

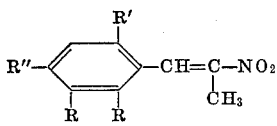

In this and succeeding formulae, one R represents lower alkoxy and the other R represents hydrogen, R' represents lower alkoxy and R" represents alkyl containing 1, 2, 3, 4, 5 or 6, or from 1 to 2, to 3, to 4, to 5, to 6 carbon atoms. In the present specification and claims, lower alkoxy represents an alkoxy moiety containing 1, 2, 3 or 4, or from 1, to 2, to 3, to 4 carbon atoms, inclusive. Representative alkoxy and alkyl moieties include methoxy, ethoxy, propoxy, isopropoxy, butoxy, methyl, ethyl, propyl, isopropyl, butyl, tert.-butyl, sec.-butyl, amyl, isoamyl and hexyl. The new nitropropane compounds are crystalline solid materials which are of low solubility in water and moderately soluble in common organic solvents such as acetone and benzene. The new compounds are useful as pesticides for the control of various pests such as bacteria, fungi, insects, crustaceans and trash fish. In addition, the new compounds of the present invention are useful as intermediates for the preparation of new 4-alkyl-2,5- and 2,6-dialkoxy-α-methylphenethylamines and their pharmacologically-acceptable salts. These latter new compounds are valuable as stimulants of the nervous system of animals, and are adapted to be employed for the study of the depressant and stimulant activity of drugs upon the central nervous system of animals.

Representative nitropropenes of the present invention include:

1 - (2,6 - dimethoxy - 4 - methylphenyl) - 2 , nitropropene,
1 - (2,5 - diethoxy - 4 - methylphenyl) - 2 - nitropene,
1 - (2,6 - diethoxy - 4 - methylphenyl) - 2 nitropene,
1 - (2,5 - dibutoxy - 4 - methylphenyl - 2 - nitropene,
1 - (2,6 - dipropoxy - 4 - methylphenyl) - 2 - nitropropene,
1 - (2,5 - dimethoxy - 4 - ethylphenyl) - 2 - nitropropene,
1 - (2,6 - dimethoxy - 4 - ethylphenyl) - 2 - nitropropene,
1 - (2,5 - diethoxy - 4 - ethylphenyl) - 2 - nitropropene,
1 - (2,6 - diethoxy - 4 - ethylphenyl) - 2 - nitropropene,
1 - (2 - methoxy - 6 - ethoxy - 4 - methylphenyl) - 2 - nitropropene,
1 - (2 - methoxy - 5 - ethoxy - 4 methylphenyl) - 2 - nitropropene,
1 - (2 - ethoxy - 5 - methoxy - 4 - methylphenyl) - 2 - nitropropene,
1 - (2 - methoxy - 6 - ethoxy - 4 - ethylphenyl) - 2 - nitropropene,
1 - (2 - methoxy - 5 - ethoxy - 4 - ethylphenyl) - 2 - nitropropene,
1 - (2 - ethoxy - 5 methoxy - 4 - ethylphenyl) - 2 - nitropropene,
1 - (2,5 - dimethoxy - 4 - butylphenyl) - 2- nitropropene,
1 - (2,6 - diethoxy - 4 hexylphenyl) - 2 - nitropropene,
1 - (2,6 - dibutoxy -4 - propylphenyl) 2 - nitropropene,
1 - (2,5 - dipropoxy - 4 - pentylphenyl) - 2 - nitropropene,
1 - (2,6 - dibutoxy - 4 - butylphenyl) - 2 - nitropropene,
1 - (2,5 - dimethoxy - 4 hexylphenyl) - 2 - nitropropene, and
1 - (2,5 - dimethoxy - 4 - propylphenyl) - 2 - nitropropene.

Preferred compounds of the present invention comprise the nitropropenes characterized by the foregoing formula wherein one R represents hydrogen and the other R represents methoxy or ethoxy and R' represents methoxy or ethoxy. A further preferred group comprises the nitropropenes wherein R as lower alkoxy occupies the five positions on the benzene ring.

The new 1-(di(lower alkoxy)-4-alkylphenyl)-2-nitropropenes of the present invention, herein referred to as "nitropropenes," can be prepared by reacting a di(lower alkoxy)-4-alkylbenzaldehyde of the following formula with nitroethane.

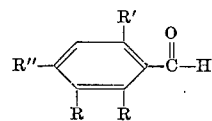

The reaction between the benzaldehyde and nitroethane in carried out in the presence of an amine as catalyst, and conveniently in an inert reaction medium, preferably an organic liquid such as acetic acid or a lower alkanol.

The reaction proceeds readily at ordinary temperatures of from 0° to 50° C. when employing a lower alkanol such as methanol, ethanol, propanol or butanol as reaction medium, and at temperatures of from 20° to 100° C. when employing acetic acid as reaction medium. In a preferred procedure, the reaction is carried out in acetic acid as reaction medium with ammonium acetate as catalyst.

The proportions of the reactants to be employed are not critical, some of the desired product being formed upon contacting the reactants in any proportions; however, the reaction consumes the di(lower alkoxy)-4-alkylbenzaldehyde and nitroethane in equimolar proportions and the use of these reactants in substantially equimolar proportions is preferred. The use of an excess of nitroethane does not adversely affect the yields obtained. The amine or ammonium acetate catalyst is employed in amounts ranging from catalytic to an amount equimolar with respect to nitroethane. Representative amines include dimethylamine, diethylamine, pyridine, methylethylamine, ammonia and piperidine.

In carrying out the production of the nitropropenes of the present invention, the di(lower alkoxy)-4-alkyl-benzaldehyde, nitroethane and catalyst are dispersed in the organic liquid. The reaction mixture thus prepared is conveniently maintained at a temperature within the reaction temperature range for from about 1 to 10 hours. Following the heating period, the reaction mixture is diluted with water and allowed to stand, whereupon the nitropropene product settles out of the diluted reaction mixture. In a convenient procedure, the water is added slowly portionwise to the reaction mixture along with seed crystals of the desired nitropropene product until the desired product begins to precipitate. This method results in the obtention of a crystalline solid product of high purity. The product which precipitates or settles in the aqueous mixture is separated by such conventional procedures as filtration, decantation or centrifugation and thereafter further purified by such conventional techniques as washing or recrystallization.

DESCRIPTION OF THE PREFERRED EMBODIMENTS

The following examples are merely illustrative and are not intended to be limiting.

Example 1

2,5-dimethoxy-4 - methylbenzaldehyde (437.5 grams; approx. 2.5 moles), ammonium acetate (155 grams; approx. 2 moles) and nitroethane (245 grams; approx. 3.2 moles) were dispersed in 1.7 kilograms of acetic acid and the resulting reaction mixture heated on the steam bath for 2.5 hours. Following the heating period, the hot reaction mixture was diluted with 500 milliliters of water and allowed to stand overnight. During the standing period, the 1-(2,5-dimethoxy-4-methylphenyl)-2-nitropropene product precipitated in the aqueous mixture as a crystalline solid. This crystalline product was removed by filtration and recrystallized from methanol. The recrystallized 1 - (2,5-dimethoxy-4-methylphenyl)-2-nitropropene product was found to melt at 86.5°–87.5° C. and found by analysis to have carbon, hydrogen and nitrogen contents of 60.89, 6.34 and 5.59 percent, respectively, as compared with the theoretical contents calculated for $C_{12}H_{15}NO_4$ of 60.75, 6.37 and 5.90 percent, respectively.

Example 2

Two separate reaction vessels each containing 2,5-dimethoxy-4-ethylbenzaldehyde (205 grams), nitroethane (102 grams) and ammonium acetate (65 grams) in glacial acetic acid (720 grams) were prepared. Each reaction vessel and contents was heated on the steam bath for five hours. Following the heating period, each of the reaction vessels was cooled to 50° C. whereupon the reaction mixtures were stirred vigorously and a small amount of the water added thereto. During the addition of the water, the 1 - (2,5-dimethoxy-4-ethylphenyl)-2-nitropropene product precipitated in the reaction mixture as a crystalline solid. This crystalline solid product was separated from the reaction mixture by filtration and washed with methanol. The washed 1 - (2,5-dimethoxy-4-ethylphenyl)-2-nitropropene product was found to melt at 67.8°–68.5° C. Infrared analysis confirmed the identity of the product.

Example 3

2,5-dimethoxy-4-methylbenzaldehyde (437 grams), nitroethane (200 grams) and 20 grams of dimethylamine are dispersed in a liter of ethanol and the resulting mixture heated with stirring for four hours at a temperature of 40° C. Following the heating period, the reaction mixture is diluted with water and cooled to precipitate the 1-(2,5-dimethoxy - 4 - methylphenyl) - 2 - nitropropene product as a crystalline solid which is separated by filtration.

The following nitropropenes of the present invention are prepared in accordance with similar operations and the foregoing teachings.

1-(2,5-dimethoxy - 4 - hexylphenyl) - 2 - nitropropene (molecular weight 307.4) by reacting together 2,5-dimethoxy-4-hexylbenzaldehyde and nitroethane in the presence of diethylamine as catalyst.

1 - (2,6 - dimethoxy - 4 - methylphenyl))-2-nitropropene (melting at 88–90°) (molecular weight 237) by reacting together 2,6 - dimethoxy-4-methylbenzaldehyde and nitroethane in the presence of diethylamine as catalyst.

1 - (2,6 - dimethoxy - 4 - ethylphenyl)-2-nitropropene (molecular weight 251)) by reacting together 2,6 - dimethoxy - 4 - ethylbenzaldehyde and nitroethane in the presence of ammonium acetate as catalyst.

1 - (2,5 - dimethoxy - 4 - amylphenyl)-2-nitropropene (molecular weight 293.4) by reacting together 2,5-dimethoxy - 4 - amylbenzaldehyde and nitroethane in the presence of dimethylamine as catalyst.

1 - (2 - ethoxy - 6 - methoxy-4-methylphenyl)-2-nitropropene (molecular weight 251) by reacting together 2-ethoxy - 6 - methoxy-4-methylbenzaldehyde and nitroethane in the presence of dimethylamine as catalyst.

1 - (2 - ethoxy - 5 - methoxy-4-methylphenyl)-2-nitropropene (molecular weight 251) by reacting together 2-ethoxy-5-methoxy-4-methylbenzaldehyde and nitroethane in the presence of diethylamine as catalyst.

1-(2,5-dimethoxy-4-tert.-butylphenyl) - 2 - nitropropene (melting at 95°–96.5° C.) by reacting together 2,5-dimethoxy-4-tert.-butylbenzaldehyde and nitroethane in the presence of ammonium acetate as catalyst.

1 - (2,5 - dibutoxy - 4 - hexylphenyl) - 2 - nitropropene (molecular weight 391) by reacting together 2,5-dibutoxy-4-hexylbenzaldehyde and nitroethane in the presence of dipropylamine as catalyst.

1-(2,6 - dibutoxy - 4 - butylphenyl)-2-nitropropene (molecular weight 363) by reacting together 2,6-dibutoxy-4-butylbenzaldehyde and nitroethane in the presence of dimethylamine as catalyst.

1-(2,5 - dimethoxy - 4 - propylphenyl)-2-nitropropene (melting at 94°–96° C.) by reacting together 2,5-dimethoxy-4-propylbenzaldehyde and nitroethane in the presence of ammonium acetate as catalyst.

1-(2,5 - diethoxy - 4-methylphenyl) - 2 - nitropropene (molecular weight 265) by reacting together 2,5-diethoxy-4-methylbenzaldehyde and nitroethane in the presence of diethylamine as catalyst.

1 - (2,5 - diethoxy - 4 - butylphenyl) - 2 - nitropropene (molecular weight 279) by reacting together 2,6-diethoxy-4-ethylbenzaldehyde and nitroethane in diethylamine as catalyst.

1-(2,6 - diethoxy - 4 - methylphenyl) - 2 - nitropropene (molecular weight 265) by reacting together 2,6-diethoxy-4-methylbenzaldehyde and nitroethane in the presence of diethylamine as catalyst.

The new compounds of the present invention are useful as pesticides for the control of a number of pests such as various bacteria, fungi, insects, crustaceans and trash fish. In such cases, the unmodified compounds can be employed. Alternatively, the compounds can also be dispersed on a finely divided solid and employed as dusts. The nitropropene compound or dust compositions containing the nitropropenes can be dispersed in water with or without the aid of surface active dispersing agents and the resulting aqueous dispersions employed as sprays, drenches or washes. In other procedures, the products of the invention can be employed as toxic constituents in solvent solutions, water-in-oil or oil-in-water emulsions or aqueous dispersions.

Additionally, the compounds of the present invention are useful as intermediates for the preparation of 4-alkyl-dialkoxy-α-methylphenethylamines and the pharmacologically-acceptable salts of such amines. In such use the 1-(di(lower alkoxy) - 4 - alkylphenyl)-2-nitropropene is reduced with lithium aluminum hydride (LiAlH$_4$) at a temperature above 0° C. and conveniently in a liquid reaction medium. Such reduction gives the free 4-alkyl-dialkoxy-α-methylphenethylamine which is separated from the reaction mixture by conventional procedures. Treatment of this free amine with the acid corresponding to the desired salt at room temperature with warming gives the pharmacologically-acceptable salt. The phenethylamines and their salts are adapted to be employed for the study of the stimulant and depressant activity of chemical materials upon the nervous system of animals, and the qualitative and quantitative evaluation of such activity. In such operations, the phenethylamine compounds are administered to animals orally or parenterally in amounts of from 0.001 to 0.5 milligram per kilogram of body weight.

In representative operations, 1-(2,5-dimethoxy-4- methylphenyl)-2-nitropropene, when employed as the sole toxic constituent in aqueous compositions and at a concentration of 100 parts per million by weight, gave complete kills and control of the growth of *Actinomyces scabies*, *Erwinia amylovora*, *Staphylococcus aureus*, *Trichophyton mentagrophytes* and poultry enteric disease when applied to cultures of the viable microorganism. In other representative operations, 1-(2,5-dimethoxy-4-tert.-butylphenyl)-2-nitropropene, when employed as the sole toxic constituent in aqueous compositions and at a concentration of 100 parts per million by weight, gave complete kill of rice blast organisms and *Trichophyton mentagrophytes* when applied to cultures of the viable microorganisms.

The di(lower alkoxy)-4-alkylbenzaldehydes employed as starting materials as herein described are prepared in known procedures from alkyl-di(lower alkoxy)-benzenes (I), or alkyl-dihydroxyphenols (II), or p-dialkoxy-benzene (III) corresponding to the following formulas:

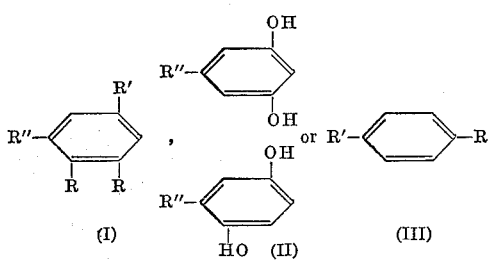

In a representative procedure, an alkyl-di(lower alkoxy)benezene (I) is reacted with N-methyl-formanilide or dimethylformamide and POCl$_3$. The reaction takes place readily at temperatures of from 20° to 100° C. with the production of the desired 4-alkyl-dialkoxy- benzaldehyde. The proportions of the reactants to be employed are not critical; however, in a preferred procedure, the N-methlformanilide or dimethylformamide and POCl$_3$ are employed in molar amounts in excess of the molar amount of 1-alkyl-di(lower alkoxy)benzene. Following the contacting of the reactants, the reaction mixture is maintained at a temperature within the reaction temperature range for several hours. Following the heating period, the reaction mixture is diluted with water and the aqueous mixture allowed to stand. During this period, the desired product will separate in the aqueous mixture as an insoluble organic oil or solid. This organic layer is then separated by filtration, decantation, centrifugation or extraction with an organic solvent and further purified by such conventional procedures as recrystallization, washing or distillation to obtain the 4-alkyl-di(lower alkoxy)-benzaldehyde starting material. In a preferred method, the benzaldehyde starting material is finally purified by column chromatography, if desired.

In a method of producing a 4-alkyl-2,5-di(lower alkoxy)benzaldehyde starting material wherein R contains from 2 to 6 carbon atoms, p-dialkoxybenzene (III) is dispersed in an organic liquid such as methylene chloride or carbon disulfide. To this dispersion is added an acylating agent. In a convenient procedure, the acylating agent is comprised of an acyl chloride (R'''Cl) and aluminum chloride. Representative acyl chlorides include acetyl chloride, propionyl chloride, butyryl chloride, valeroyl chloride and hexanoyl chloride. The acyl chloride and aluminum chloride are admixed in an organic liquid and the resulting mixture added slowly dropwise to a solution containing the p-dialkoxybenzene. An exothermic reaction proceeds readily and external cooling is required to keep the temperature of the reaction mixture within the desired range of between —10° and 40° C. during the contacting of the reactants. On completion of the reaction, the reaction mixture is poured into cold water or over ice and the resulting mixture allowed to stand until hydrolysis is complete. While the hydrolysis is taking place, the reaction mixture separates into an organic and an aqueous phase. Following the hydrolysis, the two phases are separated. The organic layer is saved and the aqueous phase extracted with an organic liquid, preferably the same organic liquid as employed as reaction medium. Following the extraction of the aqueous phase, the extraction liquid is combined with the organic layer obtained above. The combined organic portions are then extracted with aqueous sodium hydroxide to remove any 2-hydroxy-5-alkoxy-alkanophenone formed during the acylation. Following the extraction with the aqueous base, the organic layer is fractionally distilled to obtain the 2,5-dialkoxyalkanophenone product corresponding to the formula

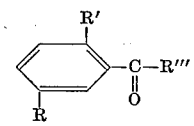

wherein R''' represents alkyl of from 1 to 5 carbon atoms and R is alkoxy. In a representative preparation by such operation, the 2,5-dimethoxyacetophenone product boiled at 107°–110° C. at 1 millimeter of mercury.

The 2,5-dialkoxyalkanophenone thus obtained and hydrazine hydrate are dispersed in a solution formed by adding potassium hydroxide to ethylene glycol. Following the addition of the 2,5-dialkoxyalkanophenone and hydrazine hydrate, the ethylene glycol mixture is heated at the boiling temperature and under reflux for several hours. Thereafter, the reaction mixture is fractionally distilled to remove the low boiling constituents and obtain a liquid residue. The residue is cooled, poured into water, acidified with HCl and extracted with ether. The ether extract is dried and distilled to obtain the 2,5-dialkoxyalkylbenzene corresponding to the formula:

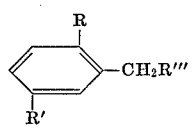

The 2,5-dialkoxyalkylbenzene is then reacted with N-methylformanilide or dimethylformamide and POCl₃ to prepare the 4-alkyl-2,5-dialkoxybenzaldehyde starting material as previously described.

The di(lower alkoxy)alkylbenzenes are prepared in known procedures by reacting a corresponding 2-alkyl-1,4-dihydroxybenzene or 3-alkyl-1,5-dihydroxybenzene (II) with a lower alkyl iodide or successively with two different lower alkyl iodides or, alternatively, with a lower alkyl iodide and thereafter with a di(lower alkyl)sulfate to introduce alkoxy moieties for hydroxyl moieties on the benzene nucleus. The reaction is carried out in the presence of a base such as sodium hydroxide or potassium carbonate and conveniently in a liquid reaction medium such as methanol or ethanol. The reaction proceeds readily at temperatures of from 15° to 45° C. with the production of the desired product and sodium iodide or sodium sulfate of reaction. Where it is desired to introduce different alkoxy groups into the alkyl-dihydroxybenzene molecule, substantially equimolecular proportions of the alkyl-dihydroxybenzene, alkyl iodide and potassium carbonate are reacted together under mild conditions to introduce one alkoxy group on the benzene nucleus of the molecule. The reaction mixture is then steam distilled and the distillate made alkaline with an alkali metal hydroxide (NaOH) to convert the alkyl-alkoxy-hydroxybenzene to its alkali metal salt. The alkaline mixture is then extracted with a solvent such as diethyl ether to remove any alkyl-di(lower alkoxy)benzene, and the aqueous residue made acidic with a mineral acid (HCl) to convert alkali metal salt to the alkyl-alkoxy-hydroxybenzene. The latter product is thereafter reacted with the different lower alkyl iodide or with the corresponding di(lower alkyl) sulfate, and with base under somewhat stronger conditions to introduce the other alkoxy group into the molecule.

Preferred embodiments of the present invention comprise those nitropropenes characterized by the foregoing formula wherein R is methoxy or ethoxy and such alkoxy substituent occupies the 5 position on the benzene ring, R' is methoxy or ethoxy and R" is methyl or ethyl.

I claim:

1. The 1-(di(lower alkoxy)-4-alkylphenyl)-2nitro-propene compound corresponding to the formula

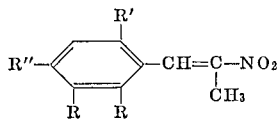

wherein one R represents hydrogen and the other R represents lower alkoxy, R' represents lower alkoxy and R" represents alkyl containing from 1 to 6 carbon atoms, inclusive.

2. The compound claimed in claim 1 wherein lower alkoxy occupies the 2 and 5 positions on the benzene ring.

3. The compound claimed in claim 1 wherein alkyl is methyl and alkoxy is methoxy which occupies the 2 and 5 positions on the benzene ring.

4. The compound claimed in claim 1 wherein alkyl is methyl and alkoxy is methoxy which occupies the 2 and 6 positions on the benzene ring.

5. The compound claimed in claim 1 wherein alkyl is ethyl and alkoxy is methoxy which occupies the 2 and 5 positions on the benzene ring.

6. The compound claimed in claim 1 wherein alkyl is ethyl and alkoxy is methoxy which occupies the 2 and 6 positions on the benzene ring.

7. The compound claimed in claim 1 which is 1-(2,5-dimethoxy-4-methylphenyl)-2-nitropropene.

8. The compound claimed in claim 1 which is 1-(2,5-dimethoxy-4-ethylphenyl)-2-nitropropene.

References Cited

UNITED STATES PATENTS 2,335,384   11/1943   Bousquent et al. ----- 424—341

OTHER REFERENCES

Kauffmann: Chem. Ber., vol. 50, pp. 630 to 637 (1917).

Gairaud et al.: J. Org. Chem. vol. 18, pp. 1 to 3 (1953).

Perekalin: Unsaturated Nitro Compounds, Daniel Davey & Co., Inc., New York, 1964, pp. 43 to 45 and 65 to 67.

LELAND A. SEBASTIAN, Primary Examiner

U.S. Cl. X.R.

260—570.8, 645; 424—330, 341